(12) United States Patent
Mayer et al.

(10) Patent No.: US 6,856,262 B2
(45) Date of Patent: Feb. 15, 2005

(54) METHOD FOR CARRYING OUT INTEGER APPROXIMATION OF TRANSFORM COEFFICIENTS, AND CODER AND DECODER

(75) Inventors: Claudia Mayer, Aachen (DE); Mathias Wien, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/344,832

(22) PCT Filed: Jul. 27, 2001

(86) PCT No.: PCT/DE01/02847
§ 371 (c)(1),
(2), (4) Date: Jul. 25, 2003

(87) PCT Pub. No.: WO02/15584
PCT Pub. Date: Feb. 21, 2002

(65) Prior Publication Data
US 2004/0046754 A1 Mar. 11, 2004

(30) Foreign Application Priority Data

Aug. 12, 2000 (DE) .......................................... 100 39 475
Dec. 29, 2000 (DE) .......................................... 100 65 298
Mar. 30, 2001 (DE) .......................................... 101 16 204

(51) Int. Cl.[7] .............................................. H04N 5/00
(52) U.S. Cl. .............................. 341/50; 341/67; 341/94; 341/106
(58) Field of Search ........................... 341/50, 67, 106, 341/107; 382/246, 233

(56) References Cited

U.S. PATENT DOCUMENTS

| 5,598,155 | A | * | 1/1997 | Ahn et al. | 341/67 |
|---|---|---|---|---|---|
| 5,945,930 | A | * | 8/1999 | Kajiwara | 341/50 |
| 6,219,457 | B1 | * | 4/2001 | Potu | 341/67 |
| 6,324,306 | B1 | * | 11/2001 | Natsume | 341/67 |
| 6,362,753 | B1 | * | 3/2002 | Kasahara | 341/50 |
| 6,636,168 | B2 | * | 10/2003 | Ohashi et al. | 341/67 |
| 6,677,869 | B2 | * | 1/2004 | Horie | 341/67 |
| 6,757,439 | B2 | * | 6/2004 | Leeder et al. | 382/246 |

OTHER PUBLICATIONS

Cham et al., *An Order–16 integer Cosine Transform*, IEEE Trans. Signal Processing, vol. 39, pp. 1205–8, May 1991.
Srinivasan et al., *An Approximation to the Discrete Cosine Transform for n=16*, Signal Processing 5, pp. 81–5.
Marek et al., *A Modified Integer Cosine Transform With Constant Self Scalar Product of the Basis Vectors Image Coding*, Applied Signal Processing, United Kingdom, 1995, vol. 2, pp. 37–47.
Komatsu et al., *Reversible Discrete Cosine Transform*, Proc. of 1998 IEEE Conference on Acoustics, Speech and Signal, New York, vol. 3, pp. 1769–72.
Soo–Chang et al., *Integer Discrete Fourier Transform and Its Extension to Integer Trigonometric Transforms*, 2000 IEEE International Symposium on Circuits and Systems, Switzerland, vol. 5, pp. 513–6.

(List continued on next page.)

Primary Examiner—Michael Tokar
Assistant Examiner—Lam T. Mai
(74) Attorney, Agent, or Firm—Kenyon & Kenyon

(57) ABSTRACT

A limited value range is defined for obtaining approximated integer cosine transform coefficients. The transform coefficients of the base vectors for the submatrices are selected by taking into account the orthogonality condition so that the sum of their squares yields the square of the constant component coefficient. The coefficients of the variable components are derived from these coefficients. These measures yield the advantage that in quantization and normalization, a uniform normalization and quantization factor may be used for all coefficients.

14 Claims, 1 Drawing Sheet

OTHER PUBLICATIONS

Xin et al., *On the Study on Transform–Based Lossless Coding*, Visual Communications and Image Processing, '99, San Jose, CA. Jan. 1999, vol. 3653, pp. 1354–63.

W. Cham, *Development of Integer Cosine Transforms By the Principle of Dyadic Symmetry*, IEEE Proc., Aug. 1999, vol. 136, pp. 276–282.

Chen et al., *A Fast Computatial Algorithm for the Discrete Cosine Transform*, IEEE Trans. Comm., Sep. 1977, vol. COM–25, No. 9, pp. 1004–9.

Telecom, Standardization Section of ITU, *New Integer Transforms for H.26L*, Study Group 16, Question 15, Meeting J, Osaka, Japan, ITU, May 2000.

Telecom. Standardization Section of ITU, *Addition of 8x8 Transform of H.26L*, Study Group 16, Question 15, Meeting 1, Red Bank, NJ, ITU, Oct.. 1999.

A.K. Jain, Fundamentals of Digital Image Processing, Englewood Cliffs, NJ: Prentice Hall, 1989, pp. 156–159.

* cited by examiner

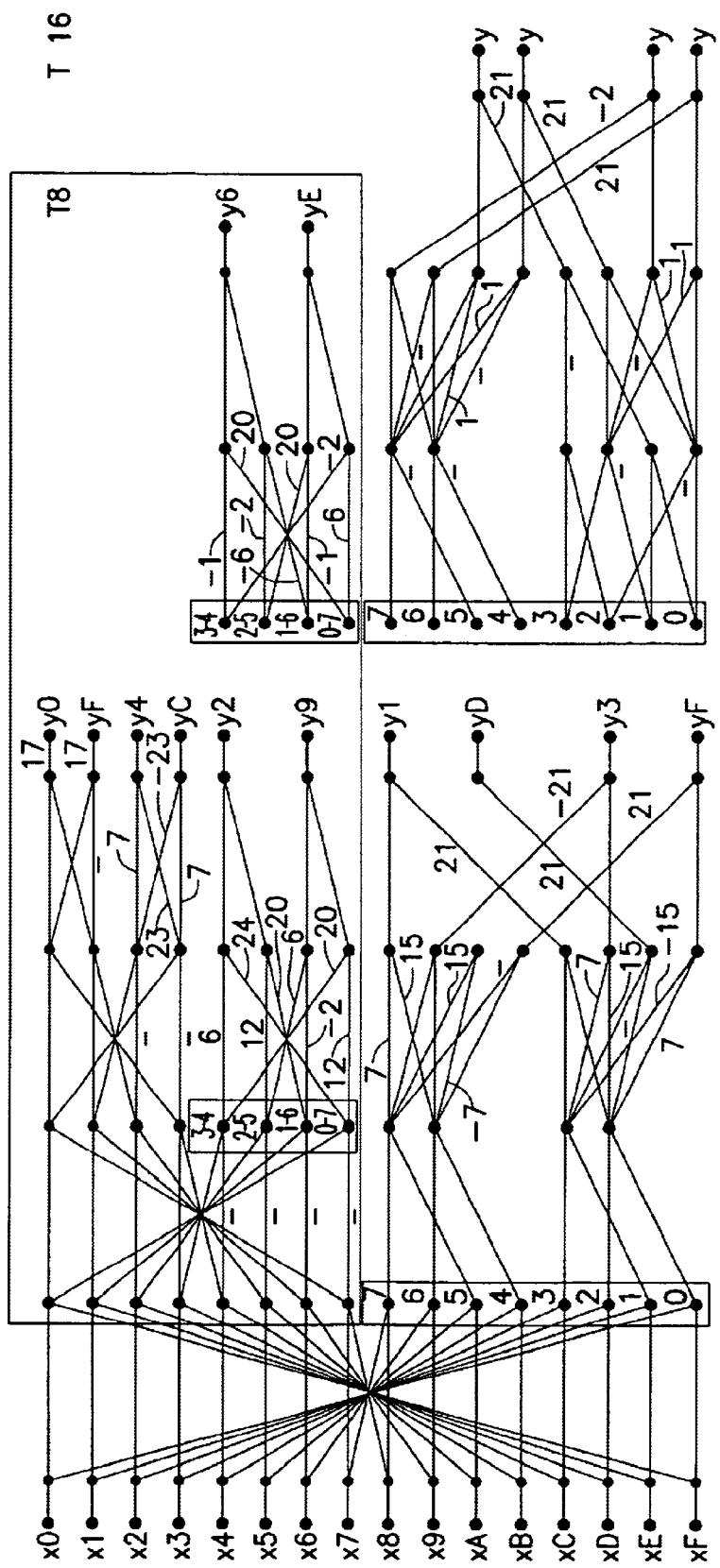

METHOD FOR CARRYING OUT INTEGER APPROXIMATION OF TRANSFORM COEFFICIENTS, AND CODER AND DECODER

BACKGROUND INFORMATION

Integer approximations of DCT (Discrete Cosine Transform) are used in frequency range coding of moving image sequences in which a pure integer arithmetic is required. Use of integer arithmetic prevents divergence between the coder and decoder due to different computation accuracies.

A 4×4 block size integer cosine transform is proposed for the test model of video coding standard H.26L. A concept which is used for transformation of block sizes linked to motion compensation is proposed in [1]. To do so, integer cosine transforms of an 8×8 and 16×16 block size are also necessary, the coefficients being selectable only in a limited range because of the limited numerical range available, e.g., 32 bit. Orthogonal integer cosine transforms of an 8×8 block size have been published in [2], for example.

There are various approaches for approximation of the DCT by an integer cosine transform. A method in which coefficients having different absolute values in DCT are replaced by integers is described in [3] and [4].

A method of approximation of DCT using the Hadamard transform is described in [5]. The DCT may be generated by multiplying the Hadamard transform times an orthogonal conversion matrix. By replacing the real conversion matrix with an orthogonal matrix having integer coefficients, an integer approximation of the DCT is generated.

SUMMARY OF THE INVENTION

The method according to the present invention supplies integer transform matrices, e.g., for block sizes of 8×8 and 16×16, having approximately the properties of DCT for frequency range coding of pixel blocks for moving image sequences, thus making it possible to increase coding efficiency.

Coding may be performed with the measures of the present invention in pure integer arithmetic. Through the choice of the transform coefficients according to the present invention, a maximum of different possible integer coefficients representing a good approximation to the non-integer DCT coefficients may be used in a limited numerical range, preferably 32 bit. The integer coefficients of the transform are selected to be less than $2^9$ with a view to the quantization and normalization of the transformed coefficients in the above numerical range. Because of integer arithmetic, these may be implemented by tabular values.

It is especially advantageous according to the present invention that the coefficients of all base vectors have the same norm, which means that in quantization and normalization, a uniform normalization and quantization factor may be used. However, in the methods according to [3] and [4], the even and odd base functions of the stated integer transforms have a different norm, so that these matrices do not fulfill the requirement of orthogonality. No methods which would result in orthogonal integer approximations of DCT, e.g., of the block size 16×16, are given in [5].

BRIEF DESCRIPTION OF THE DRAWING

The FIGURE shows an algorithm according to the present invention.

DETAILED DESCRIPTION

Before explaining the actual invention, first a few prerequisites shall be explained.

An orthogonal integer approximation of the N×N DCT must meet the conditions $$T_N \cdot T_N^T = k_N \cdot I_N \quad (1)$$

$$T_N^T \cdot T_N = k_N \cdot I_N \quad (2)$$

where $I_N$ is the unit matrix of the size N×N and $k_N$ is an integer constant.

The orthogonal integer transform of the block size 8×8 according to the present invention has the lowest maximum approximation error within the numerical range of the coefficients of $2^7$ $$e_{max} = \max\{e(t_0), e(t_1), \ldots, e(t_7)\}, \quad (3)$$

where $$e(t_m) = \left| 1 - \frac{t_{ICT,m}}{\sqrt{k_8} \cdot t_{DCT,m}} \right|, \quad (4)$$

where $t_{DCT,m}$ and $t_{ICT,m}$, where m=0, ..., 7, denote the coefficients of DCT and ICT (integer cosine transform) respectively. So far, no suggestions regarding integer approximations of DCT of the block size 16×16 are found in the literature, i.e., transforms that meet the conditions according to equations (1) and (2) for N=16. The integer transform according to the equation meets these conditions so that in contrast with the approach mentioned in [4], all the base vectors have the same norm. This means an advantage in particular in quantization and normalization of the transformed coefficients, because a uniform normalization and quantization factor may be used for all the coefficients.

Integer approximation $T_s$ of the block size 8×8 is generated by replacing the seven different real absolute values of the coefficients of the 8×8 DCT by seven integer values, taking into account the orthogonality conditions (1) and (2) for N=8.

$$T_{ICT,8} = \begin{pmatrix} 17 & 17 & 17 & 17 & 17 & 17 & 17 & 17 \\ 24 & 20 & 12 & 6 & -6 & -12 & -20 & -24 \\ 23 & 7 & -7 & -23 & -23 & -7 & 7 & 23 \\ 20 & -6 & -24 & -12 & 12 & 24 & 6 & -20 \\ 17 & -17 & -17 & 17 & 17 & -17 & -17 & 17 \\ 12 & -24 & 6 & 20 & -20 & -6 & 24 & -12 \\ 7 & -23 & 23 & -7 & -7 & 23 & -23 & 7 \\ 6 & -12 & 20 & -24 & 24 & -20 & 12 & -6 \end{pmatrix}.$$

According to [5], the DCT may be generated with the help of a conversion matrix of the size 16×16 from Hadamard transform $H_{BRO}$ of the size 16×16. BRO here stands for bit-reversed order of the base vectors of the Hadamard transform, which is known from [6], for example. The real conversion matrix is replaced by an integer orthogonal conversion matrix $C_{16}$ so that $$T_{16,BRO} = C_{16} \cdot H_{BRO}. \quad (5)$$

$C_{16}$ is a sparse matrix having a block diagonal structure, $$C_{16} = \begin{pmatrix} \hat{C}_1 & & & & \\ & \hat{C}_1 & & 0 & \\ & & \hat{C}_2 & & \\ & 0 & & \hat{C}_4 & \\ & & & & \hat{C}_8 \end{pmatrix} \quad (6)$$

where $\hat{C}_1$ denotes an individual integer coefficient, $\hat{C}_n$ is an integer orthogonal N×N matrix. For the submatrices of matrix $C_n$ the construction specification follows $$\hat{C}_{2n} = \begin{pmatrix} B_{1,n} & B_{2,n} \\ -J_n B_{2,n} J_n & J_n B_{1,n} J_n \end{pmatrix}. \quad (7)$$

where $J_n$ is the transposed standard matrix, e.g., $$J_2 = \begin{pmatrix} 0 & 1 \\ 1 & 0 \end{pmatrix},$$

and $B_{1,n}$ and $B_{2,n}$ describe integer N×N matrices whose coefficients approximate the properties of the real conversion matrix as closely as possible.

For $\hat{C}_1 = 17$, various integer orthogonal approximations of the conversion matrix may be created and thus orthogonal integer cosine transforms of the block size 16×16 where $k_{16} = 16 \times 17^2$ are determined. Thus, each coefficient of the constant base vectors—constant component—of these integer cosine transforms (ICTs) has a value of 17. The coefficients of the submatices for the variable components may be derived from this value 17 by the fact that squaring 17 yields the sum of the squared coefficient values of each row of the submatrices. For the coefficients of the lowest variable component, this yields absolute values 15 and 8 because $17^2 = 15^2 + 8^2$. The values of the coefficients for the second lowest variable component are derived accordingly, resulting in, e.g., 12, 9, and 8, and for the third lowest variable component, in e.g., 13, 10, 4, and 2. For the sake of illustration, one of the possible solutions for the matrix $C_{16}$ and thus also for $T_{ICT,16}$ is given below. Matrices $\hat{C}_n$ may be selected as follows:

$$\hat{C}_1 = 17$$

$$\hat{C}_2 = \begin{pmatrix} 15 & 8 \\ -8 & 15 \end{pmatrix}$$

$$\hat{C}_4 = \begin{pmatrix} 12 & 0 & 9 & 8 \\ 0 & 12 & -8 & 9 \\ -9 & 8 & 12 & 0 \\ -8 & -9 & 0 & 12 \end{pmatrix}$$

$$\hat{C}_8 = \begin{pmatrix} 13 & 0 & 0 & -2 & 10 & 0 & 0 & 4 \\ 0 & 13 & 2 & 0 & 0 & 10 & -4 & 0 \\ 0 & -2 & 13 & 0 & 0 & 4 & 10 & 0 \\ 2 & 0 & 0 & 13 & -4 & 0 & 0 & 10 \\ -10 & 0 & 0 & 4 & 13 & 0 & 0 & 2 \\ 0 & -10 & -4 & 0 & 0 & 13 & -2 & 0 \\ 0 & 4 & -10 & 0 & 0 & 2 & 13 & 0 \\ -4 & 0 & 0 & -10 & -2 & 0 & 0 & 13 \end{pmatrix}$$

After appropriately resorting the row vectors of $T_{16,BRO}$, this then results in the orthogonal integer transform matrix $$T_{16} = \begin{pmatrix} 17 & 17 & 17 & 17 & 17 & 17 & 17 & 17 & | & \ldots \\ 25 & 21 & 25 & 21 & 9 & -3 & 9 & -3 & | & \ldots \\ 29 & 13 & 11 & -5 & 5 & -11 & -13 & -29 & | & \ldots \\ 9 & -3 & 9 & -3 & -25 & -21 & -25 & -21 & | & \ldots \\ 23 & 7 & -7 & -23 & -23 & -7 & 7 & 23 & | & \ldots \\ 25 & 21 & -25 & -21 & -9 & 3 & 9 & -3 & | & \ldots \\ 11 & -5 & -29 & -13 & 13 & 29 & 5 & -11 & | & \ldots \\ 9 & -3 & -9 & 3 & 25 & 21 & -25 & -21 & | & \ldots \\ 17 & -17 & -17 & 17 & 17 & -17 & -17 & 17 & | & \ldots \\ 21 & -25 & -21 & 25 & -3 & -9 & 3 & 9 & | & \ldots \\ 13 & -29 & 5 & 11 & -11 & -5 & 29 & -13 & | & \ldots \\ -3 & -9 & 3 & 9 & -21 & 25 & 21 & -25 & | & \ldots \\ 7 & -23 & 23 & -7 & -7 & 23 & -23 & 7 & | & \ldots \\ 21 & -25 & 21 & -25 & 3 & 9 & 3 & 9 & | & \ldots \\ -5 & -11 & 13 & -29 & 29 & -13 & 11 & 5 & | & \ldots \\ -3 & -9 & -3 & -9 & 21 & -25 & 21 & -25 & | & \ldots \end{pmatrix}.$$

The row vectors are continued symmetrically as even and odd values according to the DCT.

Another possible orthogonal 16×16 integer transform matrix has the following form:

$$T_{15} = \begin{bmatrix} 17 & 17 & 17 & 17 & 17 & 17 & 17 & 17 & 17 & 17 & 17 & 17 & 17 & 17 & 17 & 17 \\ 21 & 21 & 21 & 21 & 15 & 7 & 15 & 7 & -7 & -15 & -7 & -15 & -21 & -21 & -21 & -21 \\ 24 & 20 & 12 & 6 & -6 & -12 & -20 & -24 & -24 & -20 & -12 & -6 & 6 & 12 & 20 & 24 \\ 15 & 7 & 15 & 7 & -21 & -21 & -21 & -21 & 21 & 21 & 21 & 21 & -7 & -15 & -7 & -15 \\ 23 & 7 & -7 & -23 & -23 & -7 & 7 & 23 & 23 & 7 & -7 & -23 & -23 & -7 & 7 & 23 \\ 21 & 21 & -21 & -21 & -15 & -7 & 15 & 7 & -7 & -15 & 7 & 15 & 21 & 21 & -21 & -21 \\ 20 & -6 & -24 & -12 & 12 & 24 & 6 & -20 & -20 & 6 & 24 & 12 & -12 & -24 & -6 & 20 \\ 15 & 7 & -15 & -7 & 21 & 21 & -21 & -21 & 21 & 21 & -21 & -21 & 7 & 15 & -7 & -15 \\ 17 & -17 & -17 & 17 & 17 & -17 & -17 & 17 & 17 & -17 & -17 & 17 & 17 & -17 & -17 & 17 \\ 21 & -21 & -21 & 21 & 7 & -15 & -7 & 15 & -15 & 7 & 15 & -7 & -21 & 21 & 21 & -21 \\ 12 & -24 & 6 & 20 & -20 & -6 & 24 & -12 & -12 & 24 & -6 & -20 & 20 & 6 & -24 & 12 \\ 7 & -15 & -7 & 15 & -21 & 21 & 21 & -21 & 21 & -21 & -21 & 21 & -15 & 7 & 15 & -7 \\ 7 & -23 & 23 & -7 & -7 & 23 & -23 & 7 & 7 & -23 & 23 & -7 & -7 & 23 & -23 & 7 \\ 21 & -21 & 21 & -21 & -7 & 15 & -7 & 15 & -15 & 7 & -15 & 7 & 21 & -21 & 21 & -21 \\ 6 & -12 & 20 & -24 & 24 & -20 & 12 & -6 & -6 & 12 & -20 & 24 & -24 & 20 & -12 & 6 \\ 7 & -15 & 7 & -15 & 21 & -21 & 21 & -21 & 21 & -21 & 21 & -21 & 15 & -7 & 15 & -7 \end{bmatrix}$$

It is constructed as follows:

The even rows 0:2:14 correspond to the even rows of $T_{ICT,8}$ described above, the continuation of row length 8 to 16 being accomplished by mirroring of the coefficients. The odd rows 1:2:15 are obtained as follows:

Ordered Hadamard matrix:

$$H_{16} = \begin{bmatrix} 1 & 1 & 1 & 1 & 1 & 1 & 1 & 1 & 1 & 1 & 1 & 1 & 1 & 1 & 1 & 1 \\ 1 & -1 & -1 & 1 & 1 & -1 & -1 & 1 & 1 & -1 & -1 & 1 & 1 & -1 & -1 & 1 \\ 1 & 1 & -1 & -1 & -1 & -1 & 1 & 1 & 1 & 1 & -1 & -1 & -1 & -1 & 1 & 1 \\ 1 & -1 & 1 & -1 & -1 & 1 & -1 & 1 & 1 & -1 & 1 & -1 & -1 & 1 & -1 & 1 \\ 1 & 1 & 1 & 1 & -1 & -1 & -1 & -1 & -1 & -1 & -1 & -1 & 1 & 1 & 1 & 1 \\ 1 & -1 & -1 & 1 & -1 & 1 & 1 & -1 & -1 & 1 & 1 & -1 & 1 & -1 & -1 & 1 \\ 1 & 1 & -1 & -1 & 1 & 1 & -1 & -1 & -1 & -1 & 1 & 1 & -1 & -1 & 1 & 1 \\ 1 & -1 & 1 & -1 & 1 & -1 & 1 & -1 & -1 & 1 & -1 & 1 & -1 & 1 & -1 & 1 \\ 1 & 1 & 1 & 1 & 1 & 1 & 1 & 1 & -1 & -1 & -1 & -1 & -1 & -1 & -1 & -1 \\ 1 & -1 & -1 & 1 & 1 & -1 & -1 & 1 & -1 & 1 & 1 & -1 & -1 & 1 & 1 & -1 \\ 1 & 1 & -1 & -1 & -1 & -1 & 1 & 1 & -1 & -1 & 1 & 1 & 1 & 1 & -1 & -1 \\ 1 & -1 & 1 & -1 & -1 & 1 & -1 & 1 & -1 & 1 & -1 & 1 & 1 & -1 & 1 & -1 \\ 1 & 1 & 1 & 1 & -1 & -1 & -1 & -1 & 1 & 1 & 1 & 1 & -1 & -1 & -1 & -1 \\ 1 & -1 & -1 & 1 & -1 & 1 & 1 & -1 & 1 & -1 & -1 & 1 & -1 & 1 & 1 & -1 \\ 1 & 1 & -1 & -1 & 1 & 1 & -1 & -1 & 1 & 1 & -1 & -1 & 1 & 1 & -1 & -1 \\ 1 & -1 & 1 & -1 & 1 & -1 & 1 & -1 & 1 & -1 & 1 & -1 & 1 & -1 & 1 & -1 \end{bmatrix}$$

Construction of orthogonal conversion matrix A:

$$C_8 = \begin{bmatrix} 16 & 0 & 0 & -2 & 5 & 0 & 0 & 2 \\ 0 & 16 & 2 & 0 & 0 & 5 & -2 & 0 \\ 0 & -2 & 16 & 0 & 0 & 2 & 5 & 0 \\ 2 & 0 & 0 & 16 & -2 & 0 & 0 & 5 \\ -5 & 0 & 0 & 2 & 16 & 0 & 0 & 2 \\ 0 & -5 & -2 & 0 & 0 & 16 & -2 & 0 \\ 0 & 2 & -5 & 0 & 0 & 2 & 16 & 0 \\ -2 & 0 & 0 & -5 & -2 & 0 & 0 & 16 \end{bmatrix}$$

In Matlab notation:

A=[zeros (8), zeros (8); zeros (8), $C_8$];

Tn=A*H16.

The values of the coefficients in the rows of the C8 matrix: 2, 2, 5 and 16 in turn yield the square of the constant component 17, each being squared and added up.

The odd base functions of T16 are derived as follows (again in Matlab notation):

T16(2:2:16,:)=Tn([9 13 11 15 10 14 12 16],:).

In other words, the 9th row of Tn becomes the 2nd row of T16, the 13th row of Tn becomes the 4th row of T16, and so forth.

The advantage of this matrix $T_{16}$ is in addition to a higher transform gain the fact that it is constructed with the help of the highly symmetrical matrices given above. Thus, efficient implementation in a coder and/or a corresponding decoder for transform coding of pixel information within blocks is possible.

The transform gain of an orthogonal transform having N base vectors is given by the ratio of the variance of the input signal after quantization to the variance of the signal transformed with transform matrix $T_N$ and then quantized. This transform gain is usually given in dB. In the literature, real video signals are frequently modeled by a 1st order autoregressive process. This model is described completely by giving the signal variance and the correlation coefficient.

Assuming optimum quantization and coding, the transform gain for this signal model may be given directly. For the correlation coefficient of 0.95, which is typical of video signals, a transform gain of 9.46 dB is obtained for DCT, 8.17 dB for the 16×16 matrix presented in the first example and 8.86 dB for the latter 16×16 matrix.

Coders and decoders for frequency range coding/decoding of moving image sequences may be constructed with the method according to the present invention. Their transform devices must be designed so that transform coefficients are processed in accordance with the method steps presented above and/or the original moving image sequence is reconstructable from these coefficients.

For ICT matrices of the sizes 8×8 and 16×16, fast algorithms may be developed which minimize the number of required additions and multiplications.

The FIGURE shows an example of such an algorithm schematically representing the two transforms in a flow chart. ICT matrices of the size 8×8 and 16×16 are marked by boxes labeled as T8 and T16 in the FIGURE. Since the even base functions of T16 correspond exactly to those of T8, the T8 block is completely integrated into the T18 block. Coefficients of the input signal of length 16 are designated as x0, x1, x2, . . . , xF and are on the left side of the chart. The coefficients of the output signal are 0y, 1y, 2y, . . . , yF.

Nodes in the graph represent additions. Multiplications by constants are indicated by corresponding numbers at the edges. A minus sign at one edge means subtraction instead of addition.

To make the diagram more comprehensible, the chart was divided at the nodes marked by boxes, and a portion of the remaining course was illustrated next to the main chart. The corresponding node points each carry the same designations.

The following table shows the number of additions and multiplications required for the 8×8 transform and the 16×16 transform. For comparison purposes, the table contains information regarding the number of additions and multiplications for the fast Discrete Cosine Transform according to [7].

|  | T8 | | T16 | |
| --- | --- | --- | --- | --- |
|  | Addition | Multiplication | Addition | Multiplication |
| ICT | 28 | 22 | 70 | 46 |
| DCT acc. to [1] | 24 | 16 | 72 | 44 |

The flow chart for fast implementation of the T16 and T8 matrices according to the FIGURE contains some elements that occur repeatedly. This regularity reflects the symmetries within the transform. The chart is subdivided into four steps characterized by a perpendicular plane of node points. These are designated as steps 1 through 4 below.

In the first step, pairs of input coefficients are added and subtracted, resulting in 16 coefficients again. The sums of x0 and xF, x1 and xE, x2 and xD, etc., form the input coefficients of the T8 block which represents the even base functions. The differences are applied to node 0-7 indicated in the FIGURE. These then yield the odd components. The star structure resulting from these additions and subtractions is repeated with 8 coefficients instead of 16 at the input of the block designated as T8 in step 2; then with the four upper coefficients (even base functions of T8) at step 3 and with two coefficients before outputs y0 and yF at step 4. This structure is equivalent to fast implementation of the Discrete Cosine Transform.

Stars that do not represent pure additions and subtractions but instead contain weighting coefficients also occur repeatedly. Thus, two weighted stars with four coefficients are removed from nodes 3-4, 2-5, 1-6 and 0-7 indicated in the FIGURE; these differ only in the arrangement of weights. This structure is repeated before outputs y4 and yC with other weights and two coefficients.

For the odd base functions of T16, there are variations of this weighted structure. At step 3 there are four structures here, each having two outputs with weighted coefficients and two outputs with pure additions/summations. These differ in the distribution of weights. In three of these structures, only two nodes form the input, so this results in distorted stars.

LITERATURE

[1] Telecom. Standardization Sector of ITU, "New integer transforms for H.26L", in Study Group 16, Question 15, Meeting J, (Osaka, Japan), ITU, May 2000.

[2] Telecom. Standardization Sector of ITU, "Addition of 8×8 transform to H.26L", in Study Group 16, Question 15, Meeting I, (Red Bank, N.J.), ITU, October 1999.

[3] W. Cham, "Development of integer cosine transforms by the principle of dyadic symmetry", IEE Proc., vol. 136, pp. 276–282, August 1999.

[4] W. Cham and Y. Chan, "An order-16 integer cosine transform, "IEEE Trans. Signal Processing, vol.39, pp.1205 1208, May 1991.

[5] R. Srinivasan and K. Rao, "An approximation to the discrete cosine transform for n=16", Signal Processing 5, pp. 81–85, 1983.

[6] A. K. Jain, Fundamentals of digital image processing. Englewood Cliffs, N.J.: Prentice Hall, 1989.

[7] W. H. Chen, C. H. Smith, and S. C. Fralick, "A Fast Computatial Algorithm for the Discrete Cosine Transform", IEEE Trans. Comm., Vol. COM-25, No. 9, September 1977, pp. 1004 1009.

What is claimed is:

1. A method of obtaining approximated integer cosine transform coefficients, comprising:
selecting the transform coefficients by:
defining a limited value range for the transform coefficients,
selecting coefficients of base vectors for submatrices by taking into account an orthogonality condition, so that a sum of squares of the coefficients of the base vectors yields a square of a constant component coefficient, and
deriving coefficients of variable components from the coefficients of the base vectors.

2. The method as recited in claim 1, wherein:
the transform coefficients are for coding pixel blocks.

3. The method as recited in claim 1, wherein:
at least one of a uniform normalization factor and a quantization factor is used for all of the coefficients of the base vectors.

4. The method as recited in claim 1, wherein:
block sizes coupled to a movement compensation are used for a transform.

5. The method as recited in claim 1, further comprising:
generating integer cosine transform matrices in accordance with a conversion matrix from a Hadamard transform of a same matrix size.

6. The method as recited in claim 5, wherein:
the same matrix size is 16×16.

7. The method as recited in claim 1, further comprising:
selecting 17 for the coefficients of the base vectors for the constant component coefficient.

8. The method as recited in claim 5, further comprising:
selecting the coefficients of the base vectors for a lowest variable component to have absolute values of 15 and 8.

9. The method as recited in claim 5, further comprising:
selecting the coefficients of the base vectors for a second lowest variable component to have absolute values of 12, 9, and 8.

10. The method as recited in claim 5, further comprising:
selecting the coefficients of the base vectors for a third lowest variable component to have absolute values of 13, 10, 4 and 2.

11. The method as recited in claim 5, further comprising:
selecting the coefficients of the base vectors for a third lowest variable component to have absolute values of 16, 5, 2 and 2.

12. The method as recited in claim 1, wherein:
essentially symmetrical algorithms are used for the transform coefficients, those of the transform coefficients on an input-end being supplied, in each case, step by step to at least one of an addition node and a subtraction node, and being weighted accordingly for a multiplication operation.

13. A coder for frequency range coding of a moving image sequence, comprising:
a transform device for creating transform coefficients for the moving image sequence, wherein the transform coefficients are processed by:
defining a limited value range for the transform coefficients,
selecting coefficients of base vectors for submatrices by taking into account an orthogonality condition, so that a sum of squares of the coefficients of the base vectors yields a square of a constant component coefficient, and
deriving coefficients of variable component from the coefficients of the base vectors.

14. A decoder for frequency range decoding of a moving image sequence, comprising:

a transform device for reconstructing a moving image sequence from transform coefficients created by:

defining a limited value range for the transform coefficients, selecting coefficients of base vectors for submatrices by taking into account an orthogonality condition, so that a sum of squares of the coefficients of the base vectors yields a square of a constant component coefficient, and deriving coefficients of variable components from the coefficients of the base vectors.

* * * * *